United States Patent [19]

Udagawa

[11] 4,255,482
[45] Mar. 10, 1981

[54] VIBRATION-ABSORBING FIRE-RESISTING FLOOR FOR VEHICLES, VESSELS OR THE LIKE

[75] Inventor: Nobuo Udagawa, Tokai, Japan

[73] Assignee: Takara Kenzai Seisakusho & Co., Japan

[21] Appl. No.: 922,077

[22] Filed: Jul. 5, 1978

[51] Int. Cl.³ .............................. B32B 7/00; B32B 5/16
[52] U.S. Cl. ..................................... 428/215; 428/306; 428/308; 428/310; 428/315; 428/312; 428/313; 428/317; 428/323; 428/331; 428/404; 428/407; 428/413; 428/416; 428/417; 428/418; 428/426; 428/428; 428/446; 428/424.2; 428/423.3; 428/424.4; 428/424.6; 428/425.8; 428/425.5; 428/457; 428/463; 428/920; 428/921
[58] Field of Search ................. 252/62; 428/310, 315, 428/321, 322, 323, 331, 423, 424, 457, 463, 425.8, 425.5, 215, 920, 413, 416, 418, 404, 407, 921, 446, 306, 308, 312, 313, 417, 428, 426, 424.2, 423.3, 424.4, 424.6

[56] References Cited

U.S. PATENT DOCUMENTS

| | | | |
|---|---|---|---|
| 3,468,687 | 9/1969 | Thomas | 252/62 |
| 3,515,624 | 6/1970 | Garnero | 252/278 X |
| 3,591,393 | 7/1971 | Rankine | 252/62 X |
| 3,607,605 | 9/1971 | Suzukawa | 428/310 |
| 3,682,667 | 8/1972 | Roberts et al. | 252/62 X |
| 3,904,539 | 9/1975 | Ruff | 252/62 |
| 3,922,413 | 11/1975 | Rineman | 428/310 X |
| 4,114,369 | 9/1978 | Crowley | 252/62 X |

*Primary Examiner*—Ellis P. Robinson
*Attorney, Agent, or Firm*—Lerner, David, Littenberg & Samuel

[57] ABSTRACT

A light-weighted vibration-absorbing and fire-resisting floor for a vehicle comprising three layers; a first layer comprising an epoxy or urethane synthetic resin elastic material, a second layer wherein an aggregate formed by baking fireclay mineral of kaolinite and expansible mineral is coated with the epoxy or urethane elastic synthetic resin, and a third layer composed of a fire-resisting resin mortar, and three such layers being integrally coated one over another.

12 Claims, 3 Drawing Figures

(A)

(B)

(C)

(D)

VIBRATION-ABSORBING FIRE-RESISTING FLOOR FOR VEHICLES, VESSELS OR THE LIKE

The present invention relates to a light-weighted vibration-absorbing and fire-resisting floor for vehicles, vessels or the like.

In accordance with the present invention, there comprises a lower layer, wherein a layer of epoxy or urethane synthetic resin elastic body is formed in a sheet-like fashion of given thickness (1 to 5 mm), coated by coating process on a metal base plate such as iron and steel plate, stainless steel plate, iron alloy, light alloy, light metal plate, etc. utilized for floors of vehicles, vessels or the like, and a middle layer on said lower layer of extremely light-weighted and thickness of 5 to 70 mm, wherein a surface of porous globular or lump-like bodies obtained by baking, at high temperature, kaolinite fireclay mineral and expansible mineral such as shale, sand stone or the like, is coated with said epoxy or urethane synthetic resin elastic bodies in covering fashion. On the middle layer is provided a top layer of 1–10 mm coated with fire-resisting polymer cement mortar or fire-resisting resin mortar. This top layer is coated with fire-resisting polymer cement mortar composed of cement and synthetic latex, synthetic resin emulsion and powder of the kaolinite fireclay mineral baked porous bodies or alkali resisting glass fibers alone or a mixture thereof, or fire-resisting resin mortar composed of a mixture of the epoxy or urethane synthetic resin elastic bodies and the baked porous powder alone or combined use thereof with aluminum hydroxide or the like therewith, whereby said lower layer, middle layer and top layer are integrally coated on the floor made from metal plate one over another to provide a rigid floor construction which is extremely light-weighted, can sufficiently absorb vibrations and is good in heat insulation and fire resistance.

Accordingly, the vehicles and vessels using the fire-resisting floor of the present invention may afford comfortable residing properties. These vehicles are inevitably attended by vibrations which in turn are also attended by sounds, imparting a great discomfort to passengers. In the construction of metal alone, vibrations and sounds may pass through as it is and on the other hand, the strength and the other properties are extremely high. On the other hand, synthetic rubber, synthetic resin and the like has a good vibration-absorbing characteristic but is poor in heat resistance and has the strength inferior to metal.

In the present invention, there is used synthetic rubber, synthetic resin elastic body, mineral-baked porous body, glass fiber of the like, which have good heat resistance, to thereby reduce weight and to enhance vibration-absorption as well as adequate elasticity, and accordingly, it is very effective in operation under the severe physical conditions of vehicles or the like, insuring durability and safety.

The present invention will now be described by way of example and with reference to the accompanying drawings in which.

Figure 3:
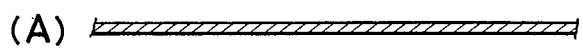
Figure 3:
Figure 3:
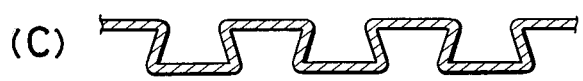
Figure 3:

FIG. 3 (A), (B), (C) and (D) are sectional views of assistance in explaining various constructions of metal plates for the floor.

Figure 1:
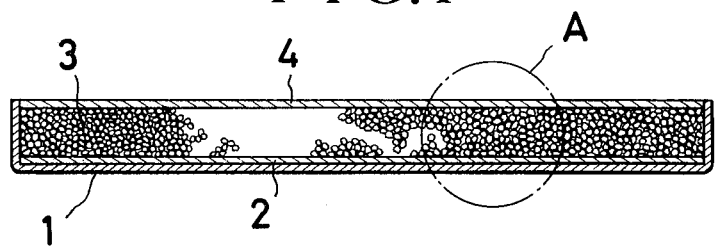
FIG. 1 is a sectional view of a vibration-absorbing and fire-resisting floor in accordance with the present invention.
Figure 2:
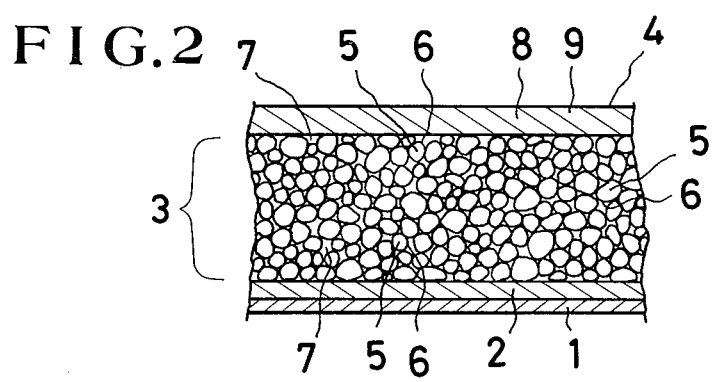
FIG. 2 is an enlarged view of a portion "A" of FIG. 1.

Referring now to FIG. 1, which is a sectional view clearly showing the construction of a vibration-absorbing and fire-resisting floor in accordance with the present invention, the floor comprises a metal plate 1, a lower layer 2 coated on the metal plate 1, the lower layer 2 being formed of a heat-resisting plastic elastic material to afford good vibration-absorbing properties, a middle layer 3 and a top layer 4. In FIG. 2, which is an enlarged view showing a portion "A" of FIG. 1, the middle layer 3 comprises a number of clay baking porous globular components or lumps 5 which forms a random block formed with spaces 7 in clearances thereof. Each of individual globular components or lumps 5 is peripherally coated with elastic epoxy or urethane synthetic resin elastic material 6, and portions of the lumps in contact with one another are firmly placed in contact with elasticity. Further, the individual globular component or lump 5 is of a porous body formed with fine foam spaces, and therefore, the middle layer is extremely light-weighted and may be almost excluded from vibrations and sounds.

The top layer 4 to be placed on the uppermost surface comprises fire-resisting resin mortar composed of the aforesaid epoxy or urethane plastic elastic material and the aforesaid porous powder or a mixture of said powder and aluminum hydroxide or the like, or a mixture 8 in the form of latex of cement and elastic natural or synthetic rubber or synthetic resin, and an aggregate 9 composed of a hardened material forming a final coating composite of the aforesaid kaolinite fireclay baking porous powder or glass fibers or a mixture thereof, which has heat resistance, is extremely high in strength and has some elasticity. Since the middle layer 3 is closely held at its upper and lower surfaces between the specific incombustible heat-resisting upper layer 4 and the base body composed of the heat-resisting metal plate 1 whereas opposite sides thereof are also closely held by opposite walls of the vehicle to greately prevent entry of air thereinto, and since there is used less in quantity than that of special non-combustible aggregate composed of high temperature crushed baked lumps from fireclay mineral of kaolinite ($Al_2O$, $2SiO_2$, $2H_2O$) using epoxy resin or polyurethane resin as adhesives or expansible mineral such as shale and sand-stone, there is extremely limited a supply of air since the interior of the paved floor is maintained in closed state totally excluded from atmosphere even if the top surface of the upper layer 4 and the heat-resisting metal plate as the base body are exposed to high temperature flame heat from the lower surface of the floor and the side walls of the vehicle when a fire of vehicle breaks out. As a consequence, the epoxy resion or polyurethane resin used in the middle layer 3 remains as an aromatic carbonaceous decomposed and condensed residue resulting from thermal decomposition peculiar to condensation polymer thereof, that is, in the state of so-called "baking in a casserole". The aforesaid resin, which is in the form of carbide in the state of "baking in a casserole", is baked on the surface between the aforesaid special heat-resisting light-weighted arregate and the non-combustible burned product to still leave a flame-resisting, heat-resisting and non-combustible intermediate adhesive layer, whereby functioning as an intermediate adhesive layer without impairing the original form thereof and satisfactorily achieving the effect as a heat-resisting and light-weighted paved floor for the vehicle. The vibration-absorbing and fire-resisting floor of the present invention constructed as described above has the excellent performance as previously mentioned, from which the life of the floor construction is greatly extended, maintenance cost is reduced, residing properties are increased, and it has non-combustible properties because of exclusion of air from the outside, and thus, the fire-resisting floor of the invention is most suitable for the floor construction used in vehicles, vessels and the like.

Cement used in the present invention includes, in addition to ordinary portland cement, slag cement and alumina cement for blast furnaces or the like.

Synthetic resin elastic material used in the present invention includes epoxy group or urethane group, and the method of use thereof is well-known. In the present invention, however, the optimum conditions are clarified by means of various examples described hereinafter. Further, kaolinite clay ($Al_2O_3$, $2SiO_2$, $2H_2O$) used in the present invention principally includes kaolin material, serinite, montmorillonite, silicic acid, iron oxide, alkali earth, oxides, etc. Such material is baked at high temperature of about 1,200° C., interior of which is a porous body of single foam, which floats in water, with specific gravity in the range of from 0.4 to 0.8, has properties of water absorbing rate 0.7-8.0%, bending strength 140-280 kg/cm$^2$, and tensile strength 164-311 kg/cm$^2$ is hard to be soluble in acid (solubility when boiled in undiluted sulfuric acid or undiluted nitric acid is less than 2%), and is never softened even if heated up to 100° C., whereby it has good fire-resistance and is hard to propagate heat.

The mineral baking porous bodies used in the middle layer are used in the form of globular or lump form, to which however is mixed expansible shale, pearl stone, obsidian, sandstone and the like. It is noted that the kaolinite fireclay baking porous bodies may be used in the form of powder when they are mixed into cement for the upper coating.

The metal plates for the floor used in the present invention include those sections (a), (b), (c), and (d) as shown in FIG. 3, and for use with vehicles or the like, the section (d) is particularly desirable.

Next, Examples of the present invention will be further described in detail.

(1) Lower layer to form a synthetic resin elastic body on the metal plate for a floor, constituents shown in Table 1 are repeatedly coated thereon to finish it into a sheet of thickness 1-5 mm. That is, $P_1$, $P_2$, $P_3$, $P_4$ and $P_5$ are respectively optimum examples. The composition may be suitably changed as the case may be. Also, plasticizer, catalyzer, pigment or the like may be suitably added.

In each of examples, coating may be applied with viscosity of from 6000 cp to 12000 cp, and the properties after hardened are as follows:
1. There is rubber elasticity.
2. Rate of elongation: More than 50%
3. Shore hardness: 40 to 70 degrees
4. Rate of thermal contraction: Less than 1.5% at 80° C.×6 hours (2) Middle layer Constituents given in Table 2 are coated on the lower layer.

(3) Top layer

Fire-resisting mortar constituents given in Table 3 are coated on the middle layer.

TABLE 1

| | | (lower layer) | |
|---|---|---|---|
| $P_1$ | (A) | Epoxy or urethane elastic synthetic resin (P) Epoxyrepolymer (amin value: 140-180) | 150 parts |
| | (B) | Bisphenol A type epoxy resin (epoxy equivalent: 190-210) | 100 parts |
| | | Flexibility-imparting agent | 50 parts |
| $P_2$ | (C) | Polyamide resin (Amine value: 300-420) | 11 parts |
| | (D) | Block type prepolymer urethane (For example, SUMITOMO Byer (Co.) Dismocap 11) | 80 parts |
| | (B) | Bisphenol A type epoxy resin (epoxy equivalent: 190-210) | 20 parts |
| | | Block dissociation agent | Small amount |
| $P_3$ | (C) | Polyamide resin (Amin value: 300-420) | 5 parts |
| | | Modified amin (for example, Epomate SA-1, amin value: 230±10, AJINOMOTO KK) | 35 parts |
| | | Modified amin (for example, Epomate B-001, amin value: 276, AJINOMOTO KK) | 25 parts |
| | (B) | Bisphenol A type epoxy resin (epoxy equivalent: 190-210) | 100 parts |
| | | Flexibility-imparting agent | 15 parts |
| | | Pigment (Toner type) | 15 parts |
| | | A suitable amount of one or two kinds of cork dust, wood dust, and cellulose fiber containing linging sulfonate (powder obtained by dewatering, drying and deodorizing waste liquid of pulp), which tend to be carbonized either to C or B and can be passed through 80 meshes, is formed into sludge and mixed. | |
| $P_4$ | (E) | Prepolymer isocyanate (NCO content: 3.0-7.0%) | 100 parts |
| | (F) | 4, 4 diaminodiphenylmethane (Amin value: 145±3KOH mg/g) | 10 parts |
| | (G) | Polypropyrene glycol (OH value: 40-50 mg KOH/g) | 40 g |
| | | A suitable amount of plasticizer (high polymer), catalyst dibutyltindilaurate, octyx lead), pigment or the like is added. | |
| $P_5$ | (H) | Trirendisocyanate trimer (NCO content: 12-13%) | 100 parts |
| | (F) | 4, 4 diaminodiphenylmethane | |

TABLE 1-continued (lower layer)

| | | |
|---|---|---|
| | (Amin value: 145$^{\pm 3}$ KOH mg/g) or amin bridge agent | 8–12 parts |
| (G) | Polypropylene glycol (OH value: 40 58 mg KOH/g) | 90 parts |
| | A suitable amount of plasticizer (high polymer), catalyst (dibutyltindilaurate, octyx lead), pigment (toner type) is added. | |

TABLE 2

(Middle layer)

P : Constituents in $P_1$–$P_5$ given in Table 1 are suitably used.
Q : Mineral baked porous material
   (a) Porous globular lumps obtained by baking at high temperature kaolinite fireclay mineral
   (b) (a) + expansible shale
   (c) (a) + pearl stone
   (d) (a) + obsidian
   (e) (a) + sand stone
       P : Q composition
       P : Q = 1 : 1–20 (preferably, 1 : 10)
       Thickness 5–70 mm

TABLE 3

(Top layer)

(1) Composition of plastic cement mortar in a mixture used
   X (latex or emulsion)
   R Natural rubber latex
     Concentration (solid), 35%
   S Synthetic rubber latex
     Concentration (solid), 35%
   T Synthetic resin Concentration
     (solid), 35%
     (Polymers such as vinyl acetate, acrylic acid, epoxy, urethane, ethylene vinyl acetate)
   Y Cement
   Z Aggregate (porous powder (Q), glass fibers and the like)
   Example:
   (Dispersion)

$$\frac{X}{Y} = \frac{45 - 70}{100} \left(= \frac{15 - 25 \text{ (solid)}}{100}\right)$$

$$\frac{Z}{Y} = \frac{100 - 200}{100}$$

Thickness 1–10 mm (2) Composition of fire resisting resin mortar in a mixture used
   P: Constituents in $P_1$–$P_5$ given in Table 1 are suitably used.
   Q: Porous material
     (a) Porous powdery body obtained by baking at high temperature kaolinite fireclay mineral + amin hydroxide powder or antimony oxide
     (b) (a) + expansible shale + alumi hydroxide powder or antimony oxide
     (c) (a) + pearl stone + alumi hydroxide or antimony oxide
     (d) (a) + obsidian + alumi hydroxide powder or antimony oxide
     (e) (a) + sand stone + alumi hydroxide powder or antimony oxide
   Alumi hydroxide (powder) or antimony hydroxide (powder) within the range of from 25 to 100% is suitably added to P ($P_1$–$P_5$).
   P:Q composition
   P:Q = 1:0.5–1:10 (preferably, 1:2.5–1:3.0)
   Thickness 1–10 mm As described above, the present invention provides a light-weighted vibration-absorbing and fire-resisting floor for vehicles or vessels, the floor comprising a lower layer composed of a layer of epoxy or urethane synthetic resin elastic material, said layer being placed on a floor-forming base plate such as metal plate in a sheet-like fashion; a middle layer composed such that a surface of porous globular lumps formed by baking, at high temperature, fireclay mineral of kaolinite ($Al_2O_3$, $2SiO_2$, $2H_2O$) and expansible mineral such as shale, sand stone or the like, it coated with the epoxy or urethane elastic synthetic resin; and a top layer composed of a fire-resisting resin mortar composition comprising a mixture of fire-resisting polymer cement, in which the porous powder and glass fibers are mixed with synthetic rubber latex, natural rubber latex or synthetic resin emulsion or the like, or urethane or epoxy elastic synthetic resin, and the porous powder or a mixture thereof with aluminum oxide or the like; said lower, middle and top layers being integrally formed one over another.

What is claimed is:

1. A lightweight, vibration-absorbing, fire-resistant floor for a vehicle or vessel comprising a metal substrate having a coating thereon, said coating comprising:

（a) a first layer for contacting with said floor comprising a resin selected from the group consisting of epoxy and urethane elastic resins, said first layer having a thickness of from about 1 millimeter to about 5 millimeters;

(b) a second layer in contact with said first layer, said second layer having a thickness of from about 5 millimeters to about 70 millimeters and being prepared from a plurality of porous globular lumps comprising a mixture of kaolinite and an expandible material baked at high temperatures, said porous globular lumps being coated with a resin selected from the group consisting of epoxy and urethane elastic resins; and (c) a third layer in contact with said second layer, said third layer having a thickness of from about 1 millimeter to about 10 millimeters and being prepared from a material selected from the group consisting of (1) cement mortar comprising a mixture of cement, an aggregate selected from the group consisting of kaolinite and glass fibers, and an emulsion selected from the group consisting of natural rubber latex, synthetic rubber latex, and synthetic resins, and (2) kaolinite and a resin selected from the group consisting of epoxy and urethane elastic resins.

2. The floor of claim 1 wherein said first layer has a viscosity ranging from about 6000 to 12000 CP.

3. The floor of claim 1 wherein said first layer comprises a plurality of coatings of said resin.

4. The floor of claim 1 wherein said first layer includes additional components selected from the group consisting of plasticizers, catalysts, pigments, fillers, and the like.

5. The floor of claim 1 wherein the weight ratio of said resin to said mixture of kaolinite and expansible material in said second layer is from 1:1 to about 1.10.

6. The floor of claim 1 wheren said expansible material is selected from the group consisting of shale, sandstone, pearlstone, obsidian, and mixtures thereof.

7. The floor of claim 1 wherein the weight ratio in said third layer (1) of said cement to said emulsion ranges from about 100/15 to about 100/25 and wherein the weight ratio of said cement to said aggregate ranges from about 100/100 to 100/200.

8. The floor of claim 1 wherein said third layer (2) includes a compound selected from the group consisting of aluminum hydroxide and antimony oxide.

9. The floor of claim 8 wherein said third layer (2) comprises a weight ratio of said resin to said combination of said kaolinite and said additional material of from about 1:2.5 to about 1:3.

10. The floor of claim 1 wherein said synthetic resin of said third layer is selected from the group consisting of acrylic resin, polyvinyl resin, polyurethane resin, epoxy resin, and ethylene vinylacetate copolymer.

11. The floor of claim 1 wherein said third layer (2) includes said expansible material.

12. The floor of claim 11 wherein said expansible material is selected from the group consisting of shale, sandstone, pearlstone, and obsidian.

* * * * *